United States Patent [19]

Jang

[11] Patent Number: 4,846,222

[45] Date of Patent: Jul. 11, 1989

[54] VOLUME FLOW CONTROL DEVICE

[76] Inventor: Yeong F. Jang, No. 70-4, Wan Tun Lane, Feng Shih Rd., Shih Kang Hsiang, Taichung Hsien, Taiwan

[21] Appl. No.: 259,717

[22] Filed: Oct. 19, 1988

[51] Int. Cl.$^4$ ............................................. F16K 21/06
[52] U.S. Cl. ................................ 137/624.12; 239/68; 239/70
[58] Field of Search ...................... 137/624.14, 624.11, 137/624.12; 239/68, 70

[56] References Cited

U.S. PATENT DOCUMENTS

| | | | |
|---|---|---|---|
| 3,638,682 | 2/1972 | Heyer | 137/624.12 |
| 4,335,852 | 6/1982 | Chow | 137/624.12 X |
| 4,562,865 | 1/1986 | Lemkin | 137/624.12 |
| 4,653,534 | 3/1987 | Chung-Shan | 137/624.12 |

Primary Examiner—Alan Cohan
Attorney, Agent, or Firm—Bacon & Thomas

[57] ABSTRACT

A volume flow control device for fitting between a faucet and a water-pipe. This device includes a base having a cylindrical mounting portion, a water inlet and a water outlet. The mounting portion receives an impeller, a throttle valve, a stationary housing with a gear train, and a control ring. Pressing down the control ring allows water to flow through this device sequentially via the inlet, the throttle valve and the outlet. The control ring can be pressed and turned to set volume flow control function. The water flowing through the stationary housing urges an impeller to actuate the gear train. The gear train is essentially engaged with the control ring so that after a certain period of time the control ring is brought back to a configuration not allowing water to flow through the device.

7 Claims, 9 Drawing Sheets

VOLUME FLOW CONTROL DEVICE

BACKGROUND OF THE INVENTION

This invention relates to a volume flow control device, and particularly to a control device which can be fitted between a water-pipe and a faucet. This device can be manually set to allow water to flow therethrough for a certain period of time. It then mechanically returns to its original configuration; i.e., preventing water from flowing therethrough. Since the device automatically stops the flow of water therethrough after a certain period of time, it is not necessary for one to turn it off manually. Since the flow of water for a certain period of time means a given quantity of water, the desired quantity of water can be obtained without wasting water.

SUMMARY OF THE INVENTION

A volume flow control device, in accordance with the present invention, includes a base having a substantially cylindrical mounting portion, a water inlet and a water outlet. The mounting portion receives an impeller, a throttle valve, a stationary housing with a gear train disposed therein, and a control ring. Pressing down the control ring allows water to flow through the inlet, the throttle valve and the outlet, respectively. Next, the control ring is turned to set the flow volume control function.

It is therefore a primary object of the present invention to provide a volume flow control device which allows water to flow therethrough for a prescribed period of time and then automatically blocks the flow of water, such that a desired quantity of water is obtained.

Another object of the present invention is to provide a volume flow control device which operates between a faucet and a water pipe so that the water flow through the faucet is controlled entirely by the device.

These and additional objects, if not set forth specifically herein, will be readily apparent to those skilled in the art from the detailed description provided hereinbelow, with appropriate reference to the accompanying drawings.

DETAILED DESCRIPTION OF THE PREFERRED EMBODIMENT

Figure 1:
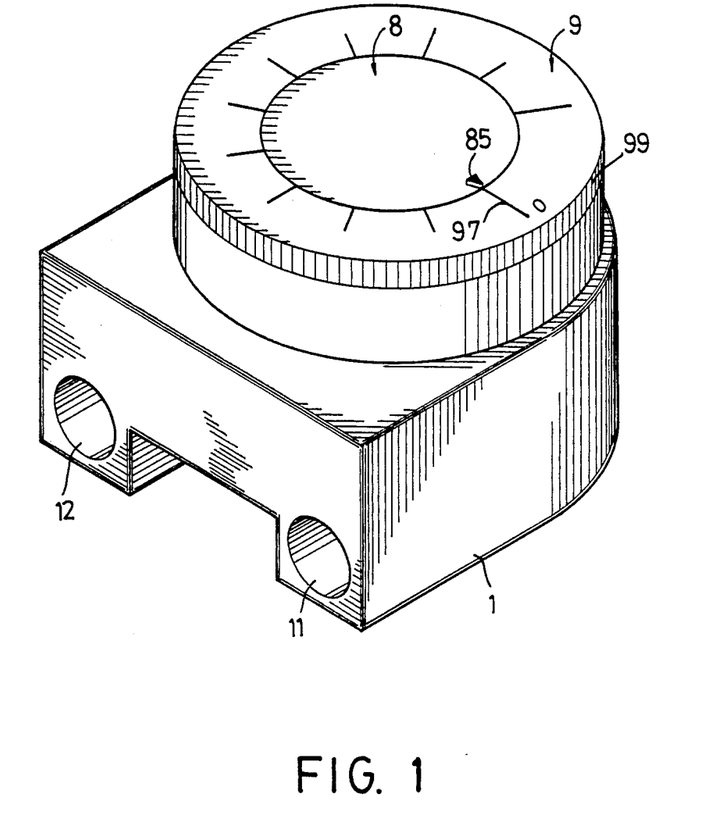
FIG. 1 is a perspective view of a volume flow control device in accordance with the present invention.

A volume flow control device is shown in FIG. 1, which comprises a base 1 having a water inlet 11 and a water outlet 12, a control ring 9, and a stationary cover. The control ring 9 has a knurled surface 99 on the outer wall for facilitating turning movement and a plurality of scales 97 for visual indication of the volume flow. The stationary cover 8 has an index 85 thereon to be used in conjunction with the scales 97.

Figure 2:
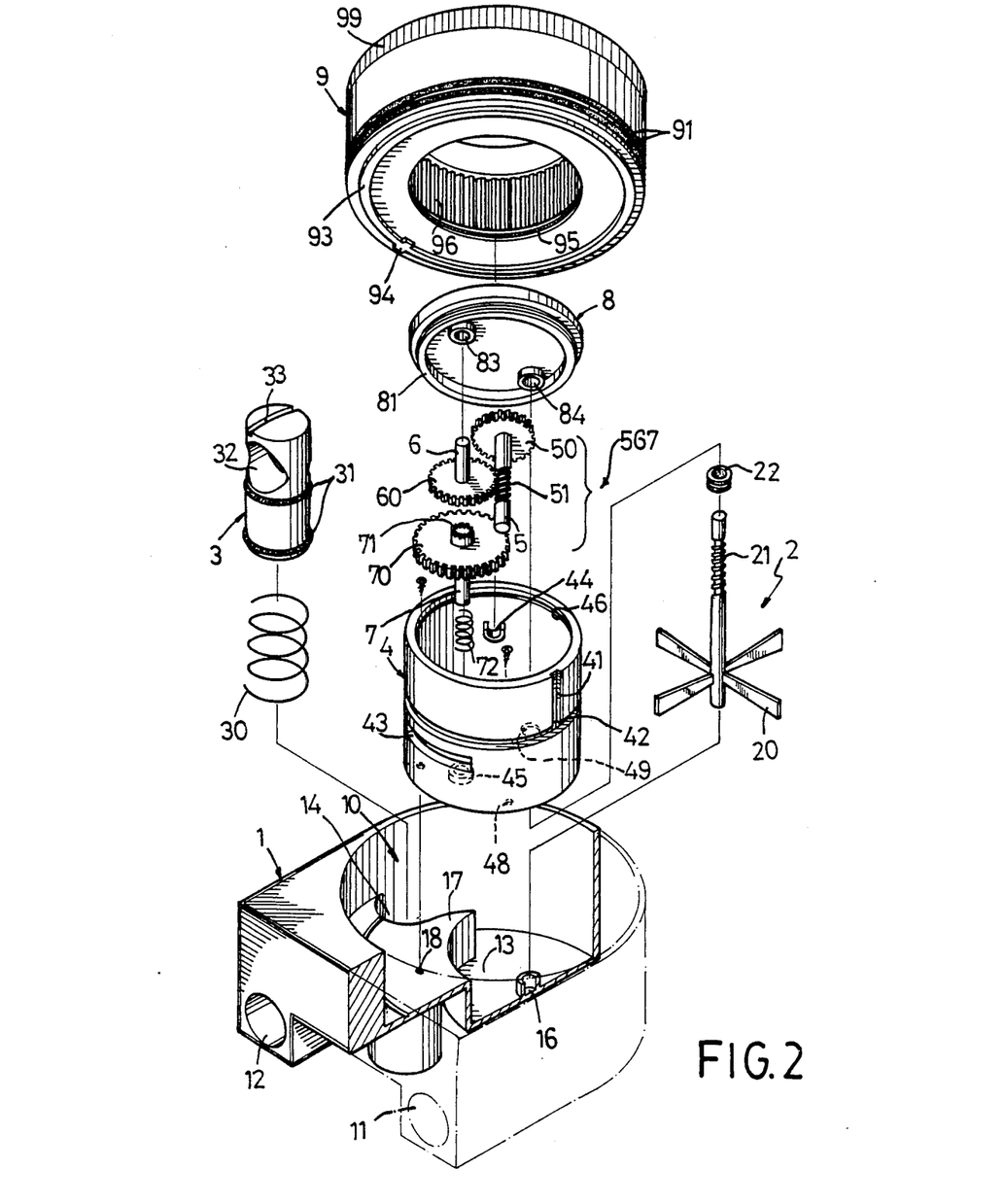
FIG. 2 is an exploded perspective view of the volume flow control device of FIG. 1.

Referring now to FIG. 2, it can be seen that the volume flow control device also comprises an impeller 2 with radially protruding blades 20 proximate to one end thereof, a stationary housing 4 which is secured by the stationary cover 8, a gear train 567 mounted within the stationary housing 4, and a throttle valve 3 to control the volume flow therethrough.

Still referring to FIG. 2, the base 1 includes a cylindrical valve barrel 14 for receiving the throttle valve 3 which is spring-loaded by spring 30. The throttle valve 3, having O-rings 31 respectively positioned proximate to central and bottom outer cylindrical surfaces thereof, is primarily used for controlling the volume flow through its distinct two portions, namely an upper portion and a lower portion, defined by the central O-ring. The upper portion of the throttle valve 3 has a bore 32 therethrough with the axis thereof in line with the outlet 12. A groove 33 is set at the top surface of the upper portion, the function of which will be described later. The base 1 has a substantially cylindrical mounting portion 10 which consists of a barrel 13, a platform 17 and the above-described valve barrel 14. A seat 16 is disposed at a central portion of the barrel 13 for receiving the impeller 2. At the top surface of the platform 17, the stationary housing 4 is secured by fastening a pair of screws 47 respectively through corresponding holes 48 at the bottom face of the stationary housing 4 and hole 18 at the platform 17. Inside the stationary housing 4, the gear train 567 includes a traverse gear-spindle 5 with a guide screw portion 51 and a gear 50 thereon, a first longitudinal gear-spindle 6 with a gear 60 and a crown gear 61 thereon, and a second longitudinal gear-spindle 7, also having a gear 70 and a crown gear 71 thereon. The traverse gear-spindle 5 crosses over a pair of supporting seats 44, which are disposed on the inner side wall of the stationary housing 4 at opposite position.

The stationary cover 8 has an annular ridge 81 at its bottom face so that it can be snappably secured to the stationary housing 4. At the bottom face of the stationary cover 8 there is disposed a spindle seat 84 and a gear seat 83. The impeller 2 has a guide thread 21 at the end opposite to the blades 20, and stands upright with one end being received into the cylindrical seat 16 and with the other end being received into the spindle seat 84. When the device is assembled, a hole 49 is provided at the bottom of the stationary housing 4 for rotatably receiving the impeller 2. A washer 22 is disposed between the hole 49 and the impeller 2 to prevent water from entering the stationary housing 4. the gear seat 83 cooperates with another gear seat 45 disposed inside the stationary housing 4 at the bottom end thereof, in which the two gear seats 83, 45 keep the gear train 567 in position.

Referring again to FIG. 2, the cylindrical control ring 9 is provided with a pair of O-rings 91 on the outer surface thereof proximate to the bottom portion thereof and another O-ring 95 being set in the inner circumference thereof. At the bottom surface of the control ring 9, an annular guide-rail 93 having a protuberance 94 thereon is provided to cooperate with the guide-groove 33 on top of the throttle valve 3 to control the timing and volume flow of water. On the inner wall of the control ring 9, there are disposed a plurality of longitudinal gear-teeth 96. The gear-teeth 96 are recessed from the wall and are driven by the gear train 567.

Figure 3:
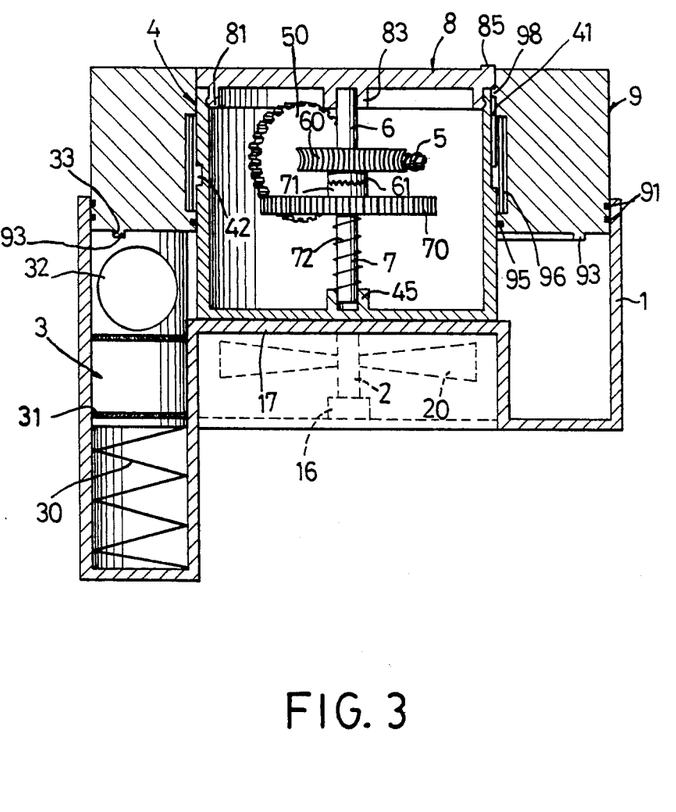
FIG. 3 is a cross-sectional view of the volume flow control device shown in FIG. 1.
Figure 4:
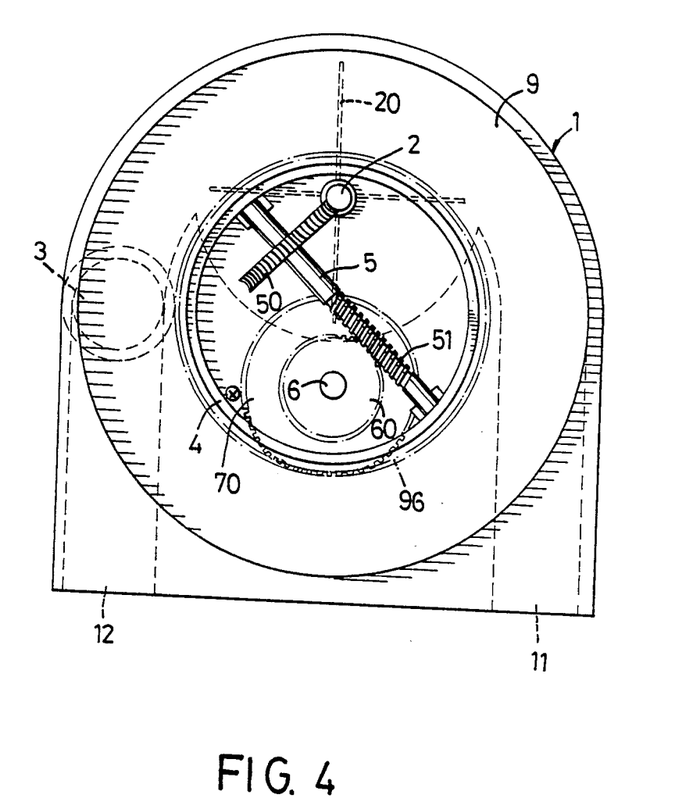
FIG. 4 is a top view of the volume flow control device of FIG. 1, particularly showing the gear train thereof.

Further referring to FIGS. 2, 3 and 4, please note the gear train 567 and the contact surface between the stationary housing 4 and the control ring 9. The stationary housing 4 is fixed onto a top surface of the platform 17 and the impeller 2 and the traverse gear-spindle 5 are seated into corresponding seats, the guide thread 21 on the impeller 2 is engaged with the gear 50 on the traverse gear-spindle 5 so that when the impeller 2 is urged to turn by the water flowing therethrough, the traverse gear-spindle 5 will also turn. Since the first and second longitudinal gear-spindle 6 and 7 are seated into respective gear seats 83, 45 and two gear-spindles 6, 7 are further engaged with each other through the pair of crown gears 61, 71, the traverse gear-spindle 5 indirectly urges the traverse gear-spindle 7 to turn due to the engagement between the gear 60 and the guide screw portion 51, as can be seen in FIG. 4.

On the outer surface of the stationary housing 4, there is disposed a longitudinal groove 41 and an annular groove 42. The longitudinal groove 41 extends lengthwise from the top end of the stationary housing 4 to the annular groove 42. Under the annular groove 42, a slot 43 is provided to allow the gear 70 to protrude out and thus to engage with the gear-teeth 96, thereby driving the control ring 9. As can be seen from FIG. 3, a ridge 98 is disposed on the inner wall of the control ring 9 which is situated slightly above the gear-teeth 96. The ridge 98 is slidable in the longitudinal groove 41 or the annular groove 42.

Still referring to FIG. 3 and 4, the flow volume control device is seen to be in a non-flow condition, in which the lower portion of the throttle valve 3 blocks water from flowing from the outlet 12. Note that the crown gear 71 is spring-loaded by a spring 72 to engage with the crown gear 61. Since in non-flow condition no water flows in the barrel 13 of the base, the impeller 2 is not turned by the water and the gear train 567 is inoperative.

Figure 5:
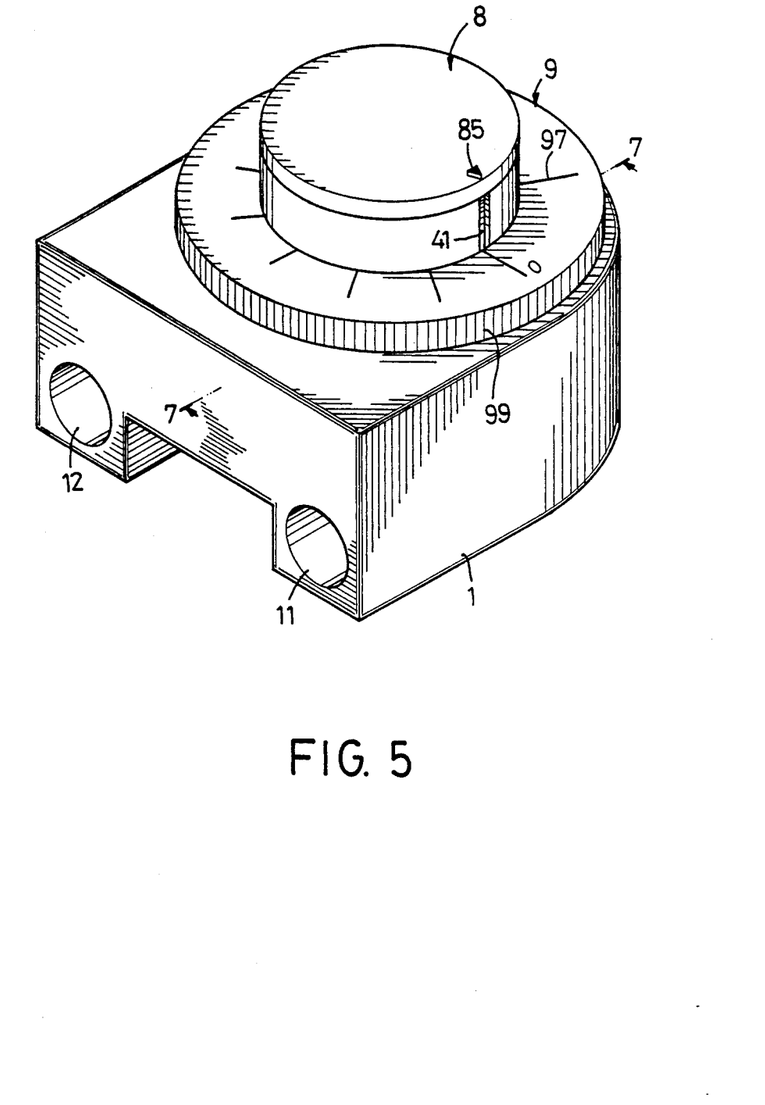
FIG. 5 is a perspective view of the volume flow control device of FIG. 1 with the control ring shown in a depressed condition.
Figure 6:
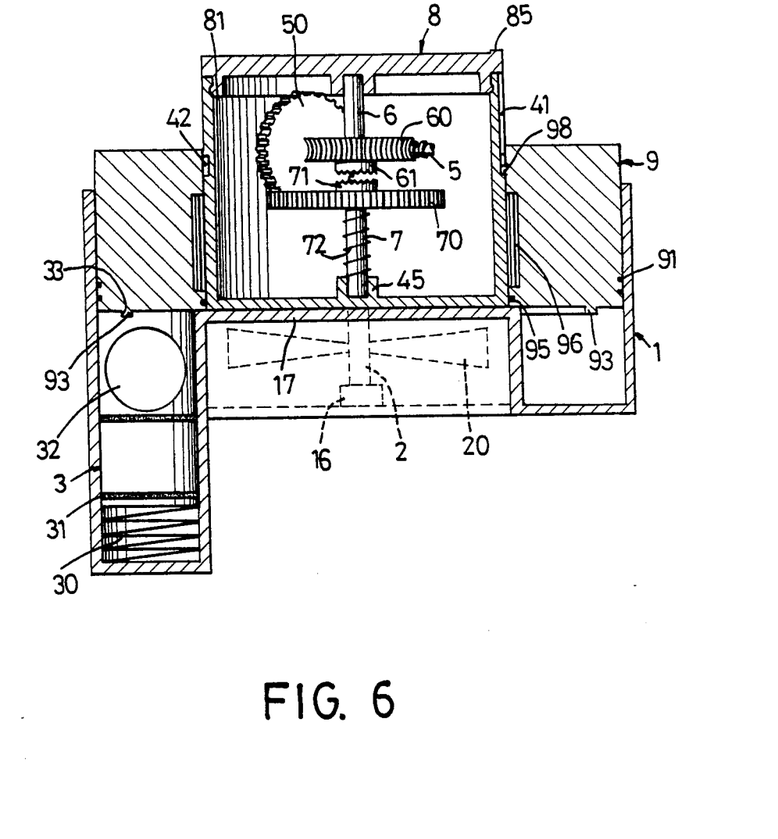
FIG. 6 is a cross-sectional view of the volume flow control device shown of FIG. 5.
Figure 7:
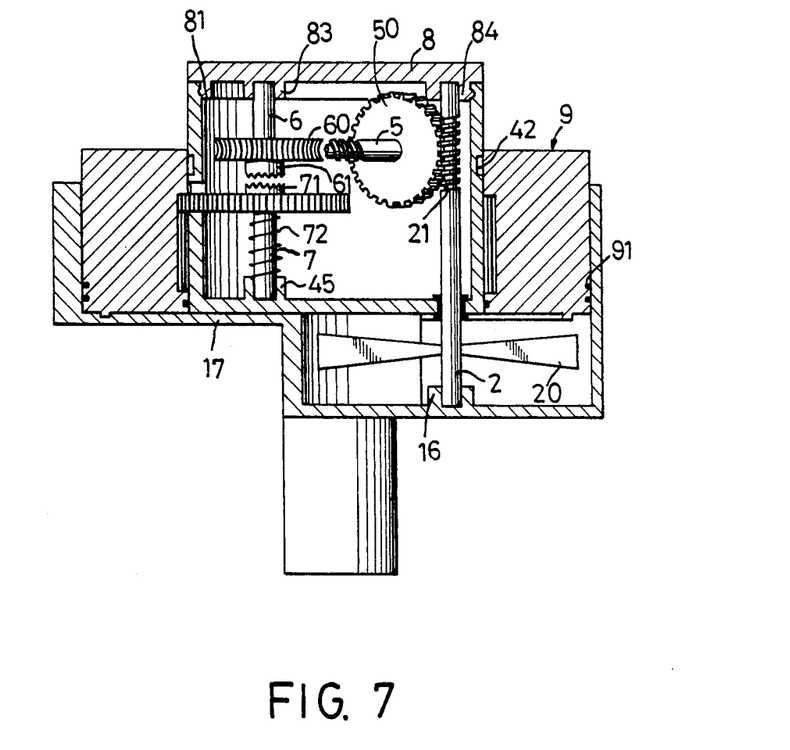
FIG. 7 is a cross-sectional view of the volume flow control device as viewed from line 7—7 of FIG. 5.
Figure 8:
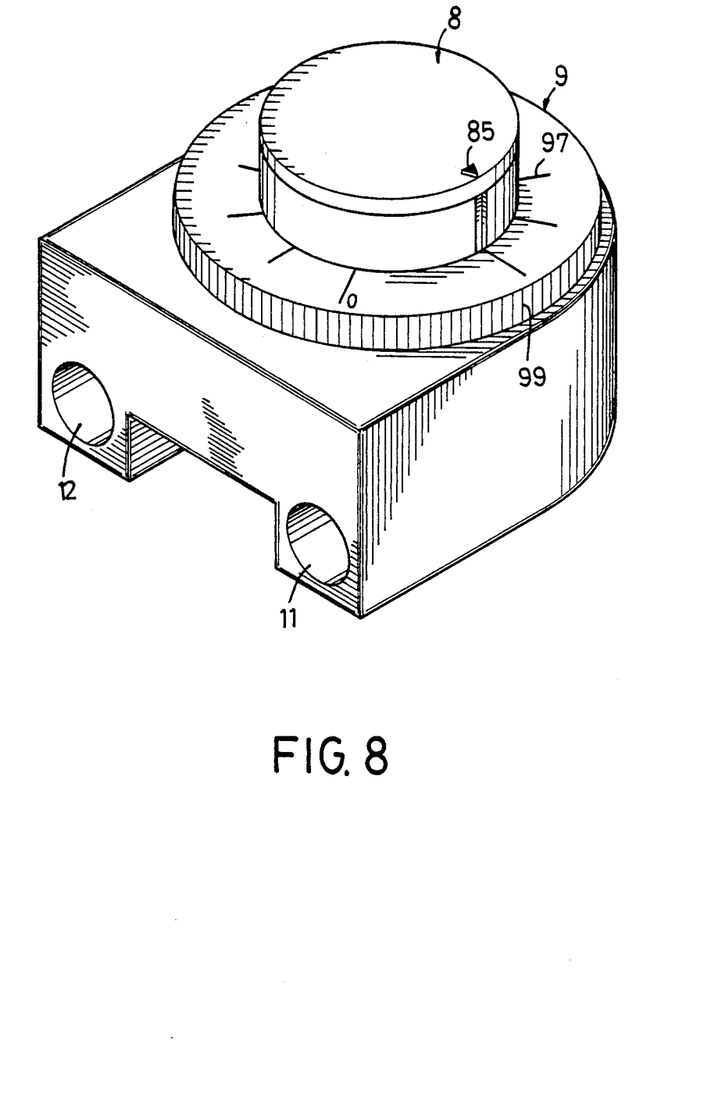
FIG. 8 is a perspective view of the volume flow control device of FIG. 1 with the control ring being pressed down and turned in the direction indicated by the pointer.
Figure 9:
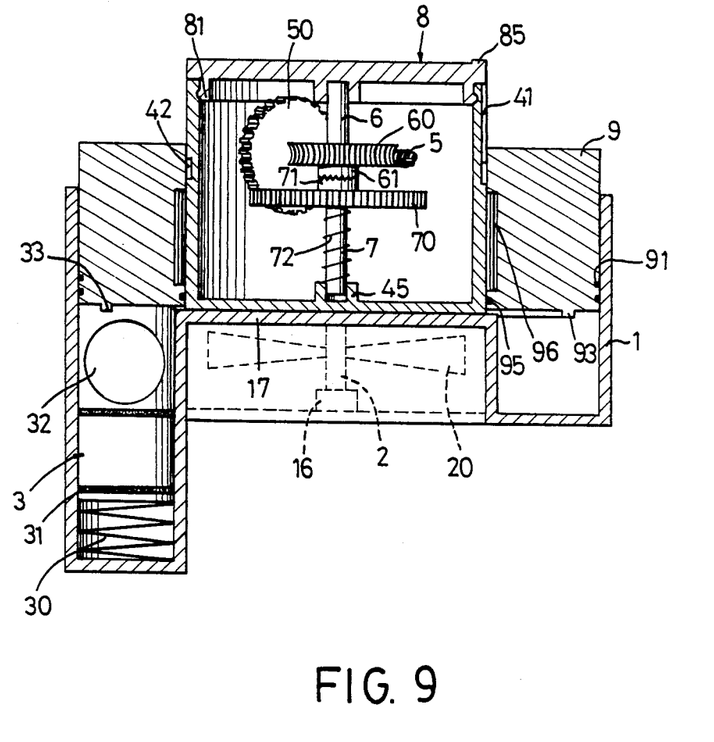
FIG. 9 is a cross-sectional view of the volume flow control device shown in FIG. 8.

The device is shown in FIG. 5 with the control ring 9 pressed down (user is not shown). The control ring 9 can only be pressed down after the ridge 98 and the longitudinal groove 41 of the stationary housing 4 are aligned. In FIG. 6, it can be seen that the control ring 9 can be pressed down until the ridge 98 thereof is stopped by the annular groove 42. At the same time, the gear spindle 7 is urged down due to the contact of the gear 70 with the control ring 9, as clearly shown in FIG. 7. At that instant, the control ring 9 is not yet urged to turn by the gear 70 and the gear-teeth 96 because the crown gears 61, 71 are disengaged. The control ring 9 can turn freely even when the impeller 2 is turned by the water flowing through the barrel 13 and the gear train 567, except when the gear 70 is in operation. It is to be noted that the control ring 9 is in a different orientation in FIG. 5 than in it is in FIG. 8. In FIG. 8, the control ring 99 has been turned clockwise (CW) from the position shown in FIG. 5. After the control ring 9 is turned, the ridge 98 is situated within the annular groove 42 and is guided thereby. When the control ring 9 is manually pressed down, turned and set to a desired position, the gear 70 engages with the gear train 567 again by the spring 72. The water keeps flowing through the device via the inlet 11 and the outlet 12. Furthermore, the impeller 2 and the gear train 567 are in operation until the ridge 98 of the control ring 9 is brought to the longitudinal groove 41 of the stationary housing 4 again. Accurate alignment of the ridge 98 with the longitudinal groove 41 is also attained by the contact between the throttle valve 3 and the protuberance 94, which is provided on the guide-rail 93 at bottom of the control ring 9. At this point, the control ring 9 is urged upward by the water flowing thereunder, along the longitudinal groove 41. When the control ring 9 rises, the throttle valve 3 also rises due to the urge of the spring 30 thereunder. the throttle valve 3 gradually diminishes the volume flow rate until its lower portion totally blocks the outlet 12. Since the device allows the water to flow therethrough over a certain period of time and then automatically blocks the flow of water, the volume flow control function is thus achieved.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A volume flow control device comprising:
   a base having a substantially cylindrical mounting portion which consists of a barrel, a platform and a valve barrel, said base also comprising a water inlet and a water outlet;
   an impeller with radially protruding blades proximate to one end thereof and a guide thread at an end opposite to said blades; said impeller being rotatably received at lower end thereof by a cylindrical seat;
   a spring-loaded throttle valve seated within said valve barrel, said throttle valve having O-rings respectively disposed proximate to central and bottom outer cylindrical surfaces thereof, an upper portion of said throttle valve having a bore therethrough with an axis thereof in line with said outlet and having a groove set at a top surface thereof;
   a stationary housing being fixed on a top surface of said platform, said stationary housing having a longitudinal groove and an annular groove on an outer surface thereof and a slot provided under said annular groove, said longitudinal groove lengthwise extending from a top end of said stationary housing to said annular groove; a gear train mounted within said stationary housing and driven by said guide thread of said impeller;
   a stationary cover which is snappably secured to said stationary housing;
   a cylindrical control ring being provided with an annular guide rail with a protuberance thereon to cooperate with said guide-groove of said throttle valve; a plurality of gear-teeth being disposed on an inner wall of said control ring; a ridge being disposed on the inner wall of said control ring above said longitudinal gear-teeth, said ridge being slidable in said longitudinal groove or said annular groove;
   characterized in that:

said lower portion of the throttle valve blocks passage for said outlet when said device is in non-flow condition; and said throttle valve is pressed downward to allow water to flow through said device via said upper portion thereof when said control ring is pressed downward and turned; said impeller is turned by water flowing through said barrel and said guide thread drives said gear train when said gear train engages with said longitudinal gear-teeth on said control ring.

2. A volume flow control device as claimed in claim 1, wherein said impeller stands upright with one end received in a seat provided on said barrel and with another end received in a spindle seat provided on a bottom face of said stationary cover; characterized in that:

a bottom end of said stationary housing has a hole for said impeller to pass through and a washer is provided therein to prevent water flowing thereunder from entering.

3. A volume flow control device as claimed in claim 1, wherein said gear train comprises a traverse gear-spindle with a guide screw portion and a gear thereon, a first longitudinal gear-spindle with a gear and a crown gear thereon, and a second longitudinal gear-spindle with a gear and a crown gear thereon;

characterized in that:

said traverse gear-spindle is disposed horizontally with two ends resting on a pair of supporting seats;

said gear train is driven by said impeller via engaement of said gear on said traverse gear spindle with said guide thread on said impeller; and said gear on second longitudinal spindle engages with said longitudinal gear-teeth via a slot provided on said stationary housing.

4. A volume flow control device as claimed in claim 3, wherein said gear train is supported by a pair of seats respectively disposed on said stationary housing and said stationary cover.

5. A volume flow control device as claimed in claim 4, wherein a spring is further provided within said seat on said stationary housing;

characterized in that:

pressing downward said control volume urges said second longitudinal spindle to disengage temporarily with said first longitudinal spindle thereby facilitating the turning movement of said control ring.

6. A volume flow control device as claimed in claim 1, wherein said control ring is provided with a pair of O-rings on an outer surface and another O-ring on inner surface to prevent water from entering.

7. A volume flow control device as claimed in claim 2, wherein said stationary cover is secured to said stationary housing by engagement of an annular ridge with an annular groove provided respectively thereon.

* * * * *